(12) United States Patent
Sugiura et al.

(10) Patent No.: US 6,379,089 B1
(45) Date of Patent: Apr. 30, 2002

(54) SEPARATION TYPE HOLE SAW (75) Inventors: Mitsuo Sugiura; Akihiro Ishizaki, both of Tokyo (JP)

(73) Assignee: Nicotec Co., Ltd., Tokyo (JP)

( * ) Notice: Subject to any disclaimer, the term of this patent is extended or adjusted under 35 U.S.C. 154(b) by 9 days.

(21) Appl. No.: 09/597,288

(22) Filed: Jun. 20, 2000

(30) Foreign Application Priority Data

Jun. 30, 1999 (JP) ............................................. 11-186822
Aug. 5, 1999 (JP) ............................................. 11-222645

(51) Int. Cl.⁷ ............................................. B23B 51/04
(52) U.S. Cl. ......................... 408/204; 408/226; 279/22
(58) Field of Search ................................ 408/204, 226, 408/703, 205, 206; 279/22, 30, 75, 905, 83

(56) References Cited

U.S. PATENT DOCUMENTS

| | | | | | |
|---|---|---|---|---|---|
| 2,039,855 A | * | 5/1936 | Stone | ........................... | 279/83 |
| 4,692,073 A | * | 9/1987 | Martindell | .................... | 279/75 |
| 5,427,482 A | * | 6/1995 | Asano et al. | ................ | 279/905 |
| 5,813,802 A | * | 9/1998 | Ajimi et al. | ................ | 408/204 |
| 6,250,856 B1 | * | 6/2001 | Miyanaga | .................... | 408/204 |

FOREIGN PATENT DOCUMENTS

JP 74515 A * 9/1985 ................. 408/204

* cited by examiner

*Primary Examiner*—Steven C. Bishop
(74) *Attorney, Agent, or Firm*—Nath & Associates PLLC; Gary M. Nath; Marvin C. Berkowitz

(57) ABSTRACT

A separation type hole saw, includes: a hole saw (3); a hole saw mounting metal fitting (2); a shank (5); a spherical body (13) inserted to the hole portion (12); an annular spring (14) inserted to the annular groove (15) and urging the spherical body (13) so that the spherical body (13) presses the fitting convex portion (2a) of the hole saw mounting metal fitting (2), thereby preventing the fitting recess portion (5a) of the shank (5) from being taken out from the fitting convex portion (2a) of the hole saw mounting metal fitting (2) due to the pressing operation of the spherical body (13); a center pin (6) inserted to a center portion of the shank (5) and guiding the hole saw (3) at a time of drilling a material in which a guide groove (19) is formed in an outer periphery of an end portion of the center pin (6) inserted to the shank (5); and a fitting member (22) provided in the shank (5). The fitting member (22) is fitted to and detached from the guide groove (19), whereby the center pin (6) is fixed to the shank (5) and is freely detached from the shank (5).

4 Claims, 13 Drawing Sheets

SEPARATION TYPE HOLE SAW

BACKGROUND OF THE INVENTION

1. Field of the Invention

The present invention relates to a separation type hole saw in which a hole saw can be, freely attached and detached and the hole saw can be easily replaced in a one-touch manner.

2. Description of the Related Art

Conventionally, the hole saw has had various kinds of drilling holes and has been required to be always provided with various kinds of hole saw mounting metal fittings being different in an effective length of a blade portion, a length of a center pin, a shape of a shank and the like. Accordingly, there has been a problem that a lot of time and labor is required for treating the hole saw and the treatment is troublesome, and the like. Therefore, a separation type hole saw tends to be increased in comparison with an integration type hole saw.

Figure 1:
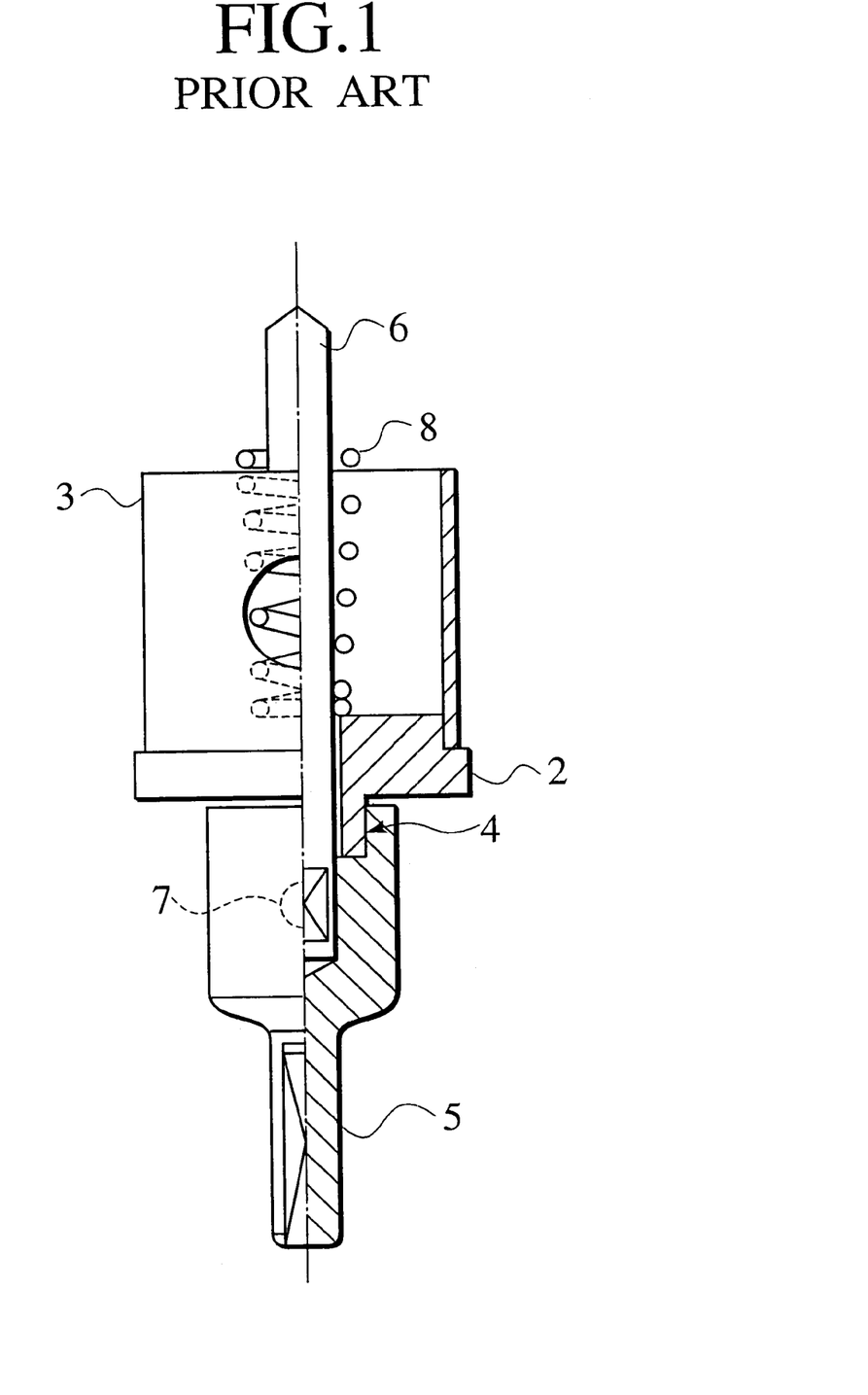
FIG. 1 is a schematic view of a conventional separation type hole saw attaching and detaching apparatus.

FIG. 1 shows a schematic view of a conventional separation type hole saw. In the drawing, a separation hole saw 1 is structured such that a hole saw 3 is integrally fixed to a mounting metal fitting 2 and is connected to a drilling portion of a working machine (not shown) by a detachable shank 5 and a screw portion 4. Further, a center pin (or a center guide drill or the like) 6 used as a center guide at a time of drilling is provided in the shank 5 and is fixed by a fastening screw 7. In this case, a spring 8 is inserted into a center pin 6, and is structured such that one end forms a stationary end being fixed to the mounting metal fitting 2 and another end forms a free end so as to remove blanks (piercing refuses) during the drilling.

Figure 2:
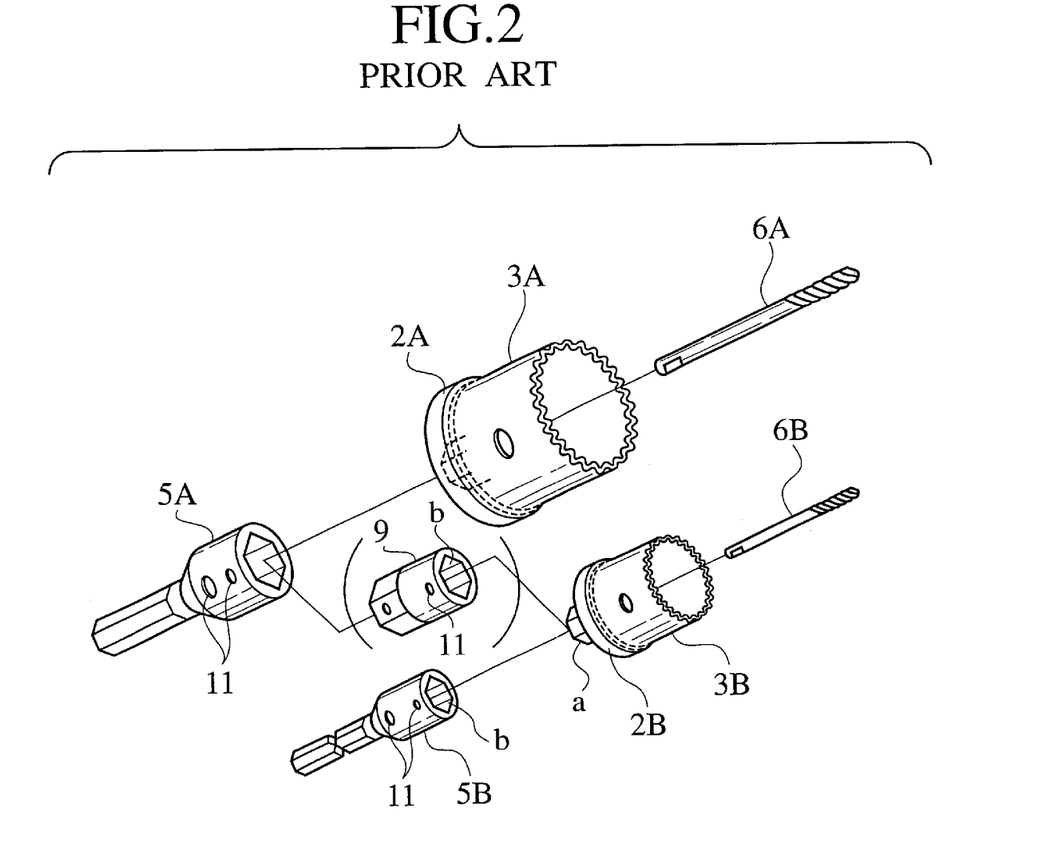
FIG. 2 is an explanatory view of a using method of a separation type hole saw attaching and detaching apparatus.

FIG. 2 shows an explanatory view of a using method of the separation type hole saw shown in FIG. 1. In the drawing, the separation type hole saw is constituted by two kinds of large and small hole saws, 3A and 3B, mounting metal fitting 2A and 2B, shanks 5A and 5B, center guide drills 6A and 6B and an intermediate connection metal fitting 9. As mentioned above, in the case that the sizes are different, the intermediate connection metal fitting 9 is frequently required. In this case, hexagonal fitting portions a and b fitting to each other are provided among the mounting metal fittings 2A and 2B, the shanks 5A and 5B and the intermediate connection metal fitting 9, and are respectively fixed by a fastening screw 11, so as to be prevented from falling off.

However, since a hexagonal wrench for fastening and loosening the fastening screw 7 is required for a replacing operation of the center pin (or the center guide drill or the like) 6, and a tool such as a spanner or the like is required for a replacing operation of the hole saw 3, there is a problem that a treatment thereof is troublesome and a working operability is reduced.

SUMMARY OF THE INVENTION

In order to solve the problems mentioned above, an object of the present invention is to provide a separation type hole saw in which a hole saw is replaced in a one-touch manner, is detachable, is easily treated and has an improved operation efficiency.

A first aspect of the present invention provides a separation type hole saw comprising: a hole saw (3) a hole saw mounting metal fitting (2), in which one end of the hole saw mounting metal fitting (2) is integrally mounted to the hole saw (3), and a polygonal fitting convex portion (2a) is formed in another end of the hole saw mounting metal fitting (2); a shank (5), in which a polygonal fitting recess portion (5a) is formed in one end of the shank (5), the fitting convex portion (2a) of the hole saw mounting metal fitting (2) is inserted to the fitting recess portion (5a), another end of the shank (5) is attached to a rotational shaft portion of a working machine, a hole portion (12) extending through the fitting recess portion (5a) from an outer peripheral surface of the shank (5) is provided, and an annular groove (15) is formed in an outer periphery at a position of the hole portion (12) of the shank (5); a spherical body (13) inserted to the hole portion (12); an annular spring (14) inserted to the annular groove (15), the annular spring (14) urging the spherical body (13) so that the spherical body (13) presses the fitting convex portion (2a) of the hole saw mounting metal fitting (2), thereby preventing the fitting recess portion (5a) of the shank (5) from being taken out from the fitting convex portion (2a) of the hole saw mounting metal fitting (2) due to the pressing operation of the spherical body (13); a center pin (6) inserted to a center portion of the shank (5) and guiding the hole saw (3) at a time of drilling a material, in which a guide groove (19) is formed in an outer periphery of an end portion of the center pin (6) inserted to the shank (5); and a fitting member (22) provided in the shank (5), the fitting member (22) being fitted to and detached from the guide groove (19), whereby the center pin (6) is fixed to the shank (5) and is freely detached from the shank (5).

A second aspect of the present invention, as it depends from the first aspect, provides a separation type hole saw, in which the guide groove (19) is an inclined groove structured such that a depth of the groove is increased along a rotational direction of the center pin (6).

According to the separation type hole saw of the first and second aspects mentioned above, since a replacing operation of the hole saw can be simply performed with one action and a treatment thereof is easy, an operation efficiency can be improved.

A third aspect of the present invention provides a separation type hole saw comprising: a hole saw (103); a hole saw mounting metal fitting (114), in which one end of the hole saw mounting metal fitting (114) is integrally mounted to the hole saw (103), a fitting convex portion (114a) is formed in another end of the hole saw mounting metal fitting (114), and a first annular groove (118) is formed in an outer periphery of the fitting convex portion (114a); a shank (115), in which a polygonal fitting recess portion (115a) is formed in one end of the shank (115), the fitting convex portion (114a) of the hole saw mounting metal fitting (114) is inserted to the fitting recess portion (115a), another end of the shank (115) is attached to a rotational shaft portion of a working machine, a first hole portion (116) extending through the fitting recess portion (115a) from an outer. peripheral surface of the shank (115) is provided, a second annular groove (121) is formed in an outer periphery at a position of the first hole portion (116) of the shank (115), a center pin insertion hole (127) if formed in the shank (115), a second hole portion (123) extending through the center pin insertion hole (127) from an outer peripheral surface is further formed in the shank (115), and a third annular groove (125) is formed in an outer periphery at a position of the second hole portion (123) of the shank (115); a first spherical body (117) inserted to the first hole portion (116); a first annular spring (120) inserted to the second annular groove (121), the first annular spring (120) urging the first spherical body (117):so that the first spherical body (117) presses the fitting convex portion (114a) of the hole saw mounting metal fitting (114), thereby preventing the fitting recess portion (115a) of the shank (115) from being taken out from the fitting convex portion (114a) of the hole saw mounting metal fitting (114) due to the pressing operation of the first spherical body (117); a center pin (6) inserted to a center portion of the shank (115):and guiding the hole saw (103) at a time of drilling a material, in which a circular arc groove (126) is formed in an outer peripheral surface of an end portion of the center pin (6) inserted to the shank (115); a second spherical body (124) inserted to the second hole portion (123); a second annular spring (122) inserted to the third annular groove (125), the second annular spring (122) urging the second spherical body (124) so that the second spherical body (124) presses the circular arc groove (126) of the center pin (6), thereby preventing the center pin (6) from being taken out from the center pin insertion hole (127) due to the pressing operation of the second spherical body (124); and an outer peripheral ring (113) provided in an outer periphery of the shank (115). in which the first annular spring (120) and the second annular spring (122) rotate at a desired rotational angle and a pressing force applied to the first spherical body (117) and the second spherical body (124) by the first annular spring (120) and the second annular spring (122) is changed when the outer peripheral ring (113) is rotated around a shaft of the shank (115), whereby a locking and canceling operation of the center pin (6) with respect to the center pin insertion hole (127) and a locking and canceling operation between the fitting recess portion (115a) of the shank (115) and the fitting convex portion (114a) of the hole saw mounting metal fitting (114) are simultaneously performed.

A fourth aspect of the present invention, provides a separation type hole saw according to the third aspect, wherein a third hole portion (141) extending through the center pin insertion hole (127) is formed in the outer peripheral surface of the shank (115), a third spherical body (143) is inserted to the third hole portion (141), the third spherical body (143) presses the annular arch groove (126) of the center pin (6) so as to prevent the center pin (6) from being taken out from the center pin insertion hole (127), and the locking and canceling operation of the center pin (6) with respect to the center pin insertion hole (127) is performed by rotating the outer peripheral ring (113) at a desired rotational angle.

A fifth aspect of the present invention provides a separation type hole saw according to the third or fourth aspect, wherein a guide groove (129) is formed in an inner surface of the outer peripheral ring (113), a fourth spherical body (131) is inserted between the guide groove (129) and the shank (115), and the guide groove (129) is formed such that a rotational angle of the outer peripheral ring (113) is kept 60 degrees.

A sixth aspect of the present invention provides a separation type hole saw according to the third aspect, the fourth aspect or the fifth aspect, wherein the first hole portion (116) is uniformly separated into three sections in a direction of extending through the fitting recess portion (115a) from the outer peripheral surface of the shank (115), and three first spherical bodies (117) are respectively inserted to the three first hole portions (116).

According to the separation type hole saws of the third to sixth aspects mentioned above, since a replacing operation of the hole saw can be simply performed with one action and a treatment thereof is easy, an operation efficiency can be improved. Further, a concentricity of the members on the basis of the respective elements, that is, an accuracy at which the centers of the elements coincide with each other can be improved and a quality can be improved.

DETAILED DESCRIPTION OF THE PREFERRED EMBODIMENTS

A description will be in detail given below of embodiments in accordance with the present invention with reference to the accompanying drawings.

Figure 3:
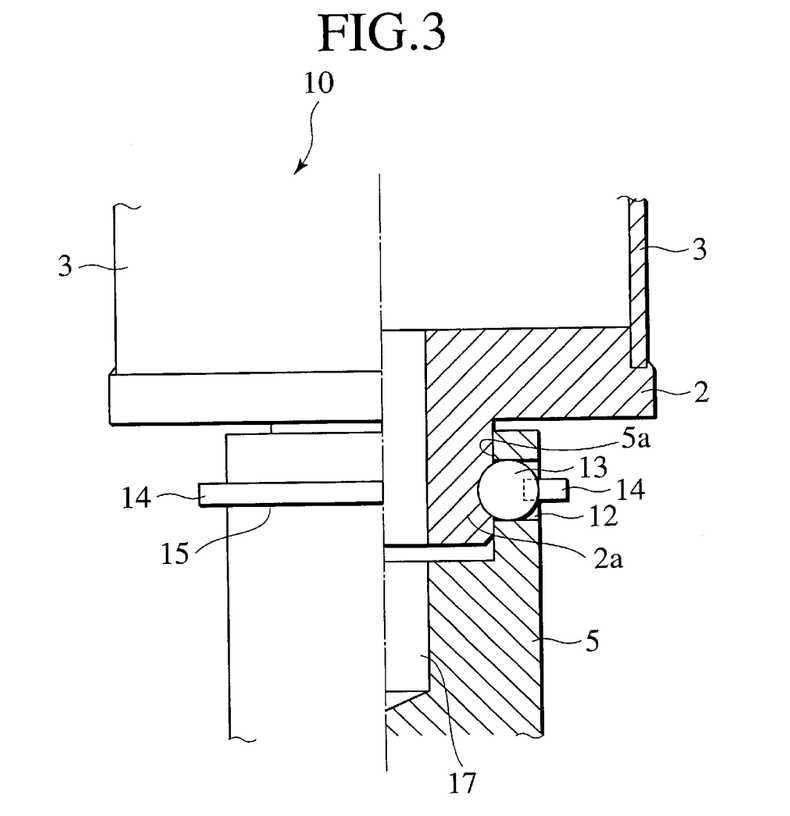
FIG. 3 is a schematic view of an embodiment corresponding to a main portion of the present invention.
Figure 4:
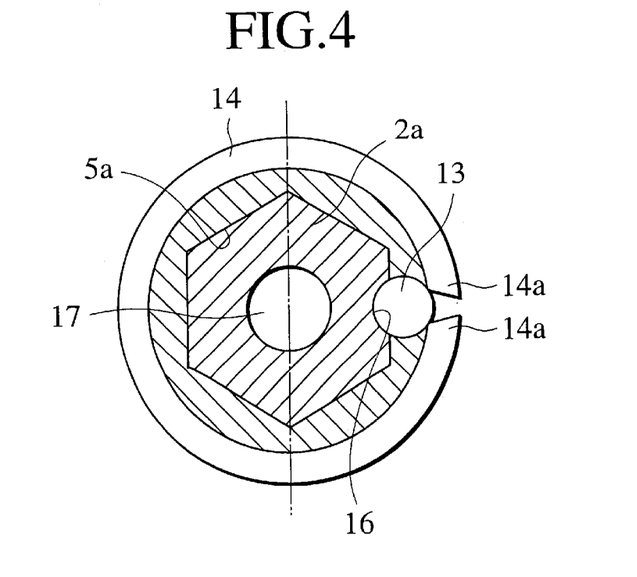
FIG. 4 is a horizontal cross sectional view of FIG. 1.

FIG. 3 is a schematic view of an embodiment corresponding to a main portion of the present invention, and FIG. 4 shows a horizontal cross sectional view of FIG. 3. In FIGS. 3 and 4, a hole saw mounting metal fitting attaching means 10 for constructing a separation type hole saw is constituted by fitting portions 2a and 5a formed between another end of a hole saw mounting metal fitting 2 and one end of a shank 5 so as to form a polygonal shape (a hexagonal shape in the present embodiment), thereby being fitted to each other, a spherical body 13 inserted to an inclined hole 12 provided in a direction of the hole saw mounting metal fitting portion 2*a* from the shank fitting portion 5*a*, and an annular spring 14 inserted into an annular groove 15 provided along an outer periphery of the shank 5. The annular spring 14 holds a spherical body 13 within the inclined hole 12 by a notch portion 14*a* having an angle of about 60 degrees so as to apply a pressing pressure. In this case, reference numeral 17 denotes an insertion hole of a center guide drill 6 inserted to the shank 5.

Figure 5A:
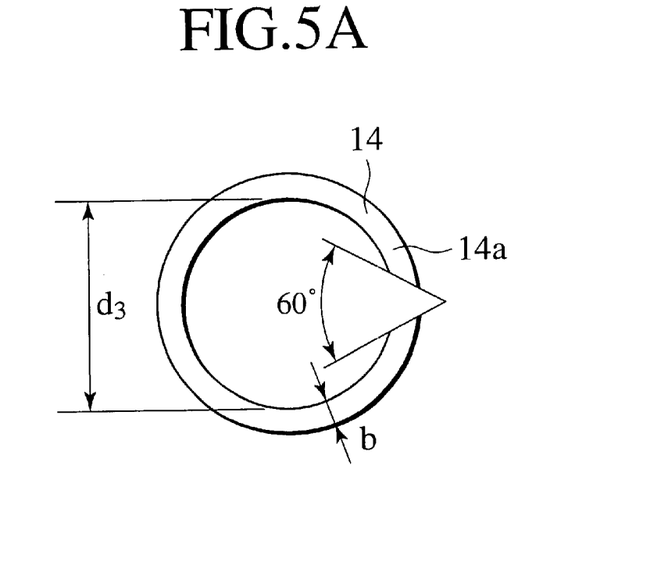
FIG. 5A is a front elevational view of a summary of an annular spring.
Figure 5B:
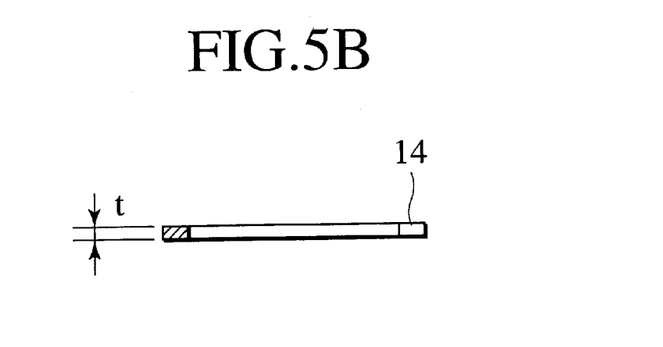
FIG. 5B is a plan view of the same.
Figure 6:
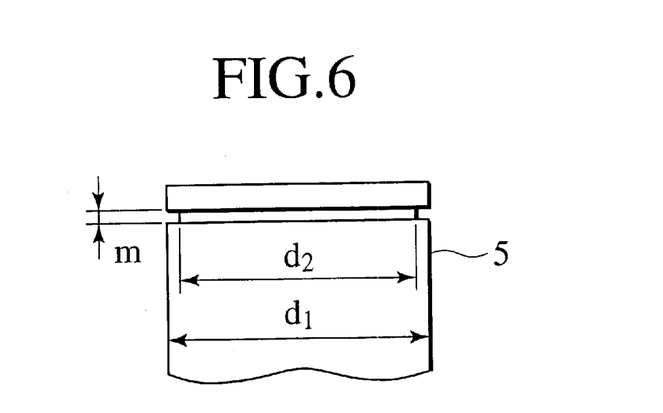
FIG. 6 is a schematic view of an annular groove provided in an outer periphery of a shank.

As shown in FIGS. 5A, 5B and 6, when setting an outer diameter d1 of an applied shank 5 to, for example, 25 mm, a reference size of a groove diameter d2 is set to 23.9 mm, a reference size of a groove width m is set to 1.35 mm, a reference size of a spring inner diameter d3 of the annular spring 14 is set to 23.4 mm, a reference size of a spring width b is set to 2 mm and a reference size of a thickness t is set to 1.2 mm, so that these sizes are made standards.

In order to attach the hole saw mounting metal fitting 2 to the shank 5, when combining the fitting portions 2*a* and 5*a* so as to insert them to the shank 5 and aligning the spherical body 13 with a recess groove 16 in the fitting portion 2*a* of the hole saw mounting metal fitting 2, the hole saw mounting metal fitting 2 is prevented from being fallen down from the shank 5 by holding the spherical body 13 within the recess groove 16 due to an elastic force of the annular spring 14.

Figure 7:
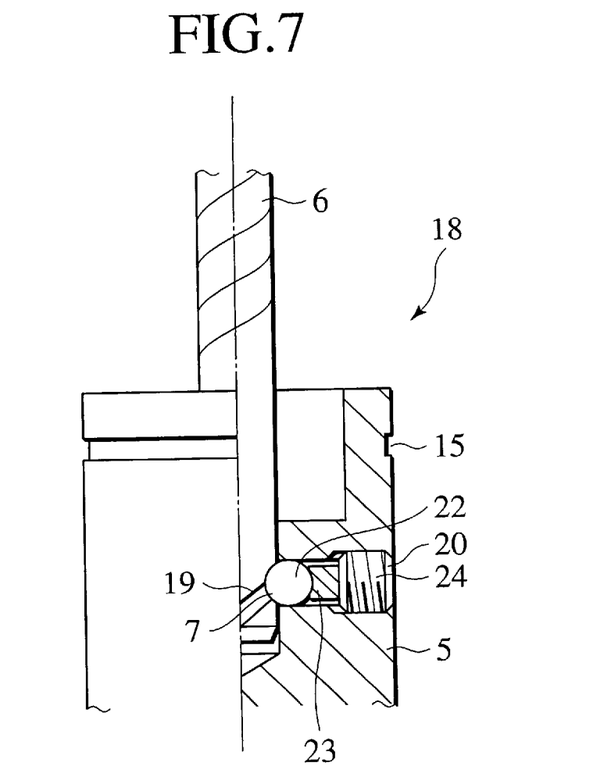
FIG. 7 is a schematic view of center pin fitting means corresponding to another main portion of the present invention.
Figure 8:
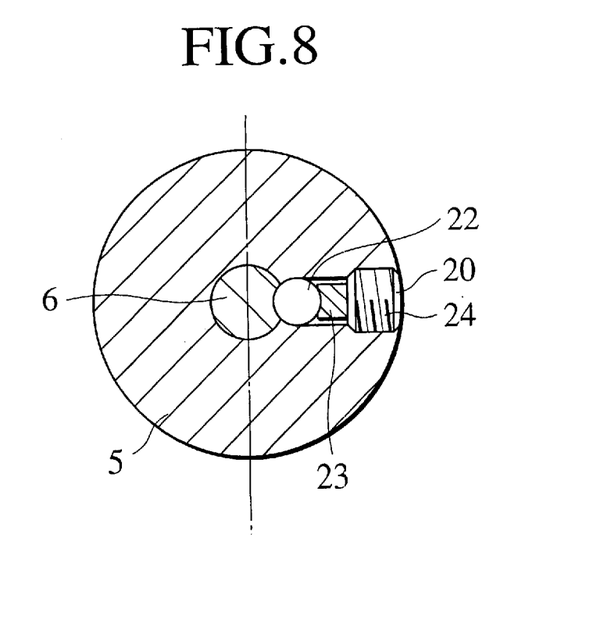
FIG. 8 is a horizontal cross sectional view of FIG. 7.
Figure 9:
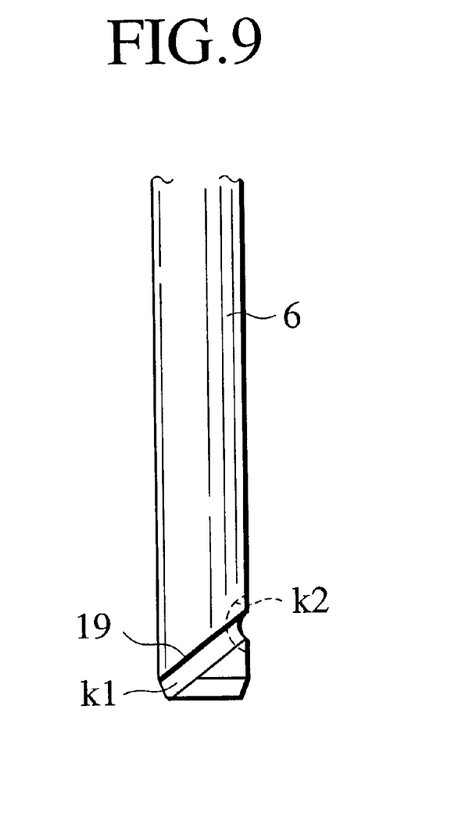
FIG. 9 is a schematic view of a working process of a guide groove in a center guide drill.
Figure 10:
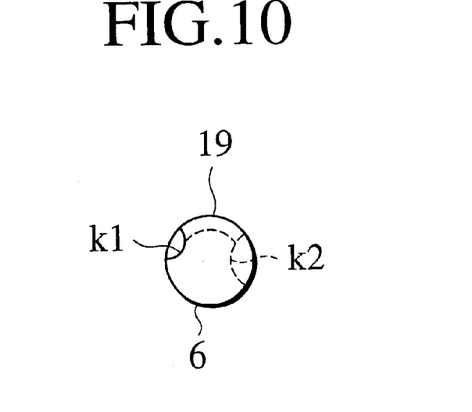
FIG. 10 is a bottom elevational view of FIG. 9.

FIG. 7 is a schematic view of center pin fitting means corresponding to another main portion of the present invention, FIG. 8 is a horizontal cross sectional view of FIG. 7, FIG. 9 is a schematic view of a working process of a guide groove in a center guide drill in FIG. 7, and FIG. 10 is a bottom elevational view of FIG. 9. In FIGS. 7 to 10, center pin fitting means 18 is constituted by a guide groove 19 provided near a shank insertion end of the center guide drill 6, and a center guide fitting member with an elastic member fitted to a guide groove 19 provided in the shank 5, in the present embodiment, a spherical body with an urethane member 20. The spherical body with the urethane member 20 is structured such that a spherical body (a ball) 22 is fitted to the guide groove 19 so as to engage the center guide drill 6 with the shank 5, thereby freely attach and detach the center guide drill 6 with respect to the shank 5. In this case, reference numeral 23 denotes an urethane rubber applying a pressing pressure to the spherical body 22, and reference numeral 24 denotes a pressing force adjusting screw engaged with the shank 5.

Figure 11:
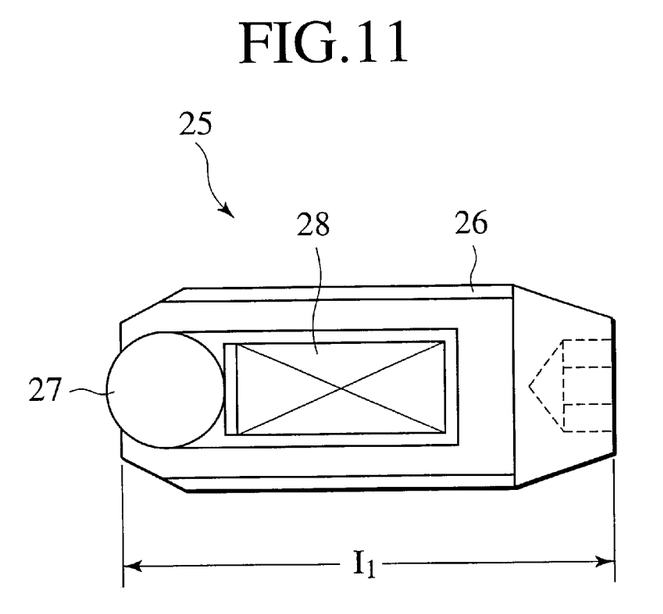
FIG. 11 is an explanatory view of another structure of center pin fitting means.

In this case, there is a risk that the drill 6 can not rotate when the spherical body 22 is completely drawn back from the guide groove 19. Accordingly, the guide groove 19 is formed in an inclined groove having a depth increasing toward a rotational direction of the drill 6, in which a groove diameter is set so as to satisfy the relation k1<k2. Accordingly, the spherical body 22 receives a pressing force in a rotational direction (a direction of k2), is always brought into contact with an inner portion of the guide groove 19, prevents the drill 6 from not rotating, and keeps a fitting state between the guide groove 19 and the spherical body 18. In this case, the urethane rubber is used as the elastic member, however, a spherical body with a spring 25 may be employed as shown in FIG. 11. A spherical body 27 and a spring 28 are integrally received within an adjusting screw 26.

Figure 12:
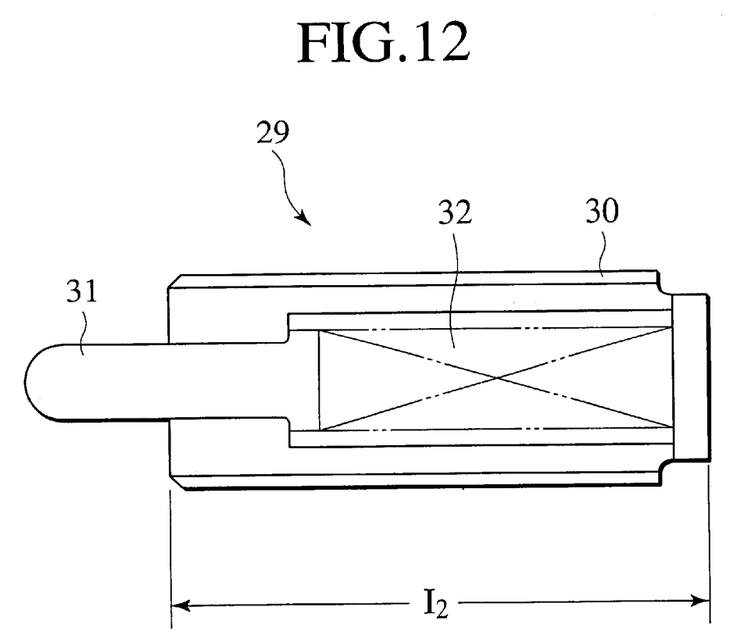
FIG. 12 is an explanatory view of the other structure of the center pin fitting means.

Further, as shown in FIG. 12, a plunger with a spring 29 may be employed. A plunger 31 and a spring 32 are integrally received within an adjusting screw 30.

In FIGS. 9 and 10, attention should be paid so that a length l of the spherical body with the spring 25 or the plunger with the spring 29 does not increase as protruding to an outer portion of the shank 5 because the shank 5 is a rotational body.

As mentioned above, the hole saw 3 is simply replaced in a one-touch manner, is detachable, is easily treated and has an improved operation efficiency since the hole saw mounting metal fitting attaching means 10 and the engaging member with the elastic member, the spherical body with the urethane member 18 in the present embodiment are provided as the separation type hole saw.

A description will be in detail given below of a second embodiment in accordance with the present invention with reference to the accompanying drawings.

Figure 13:
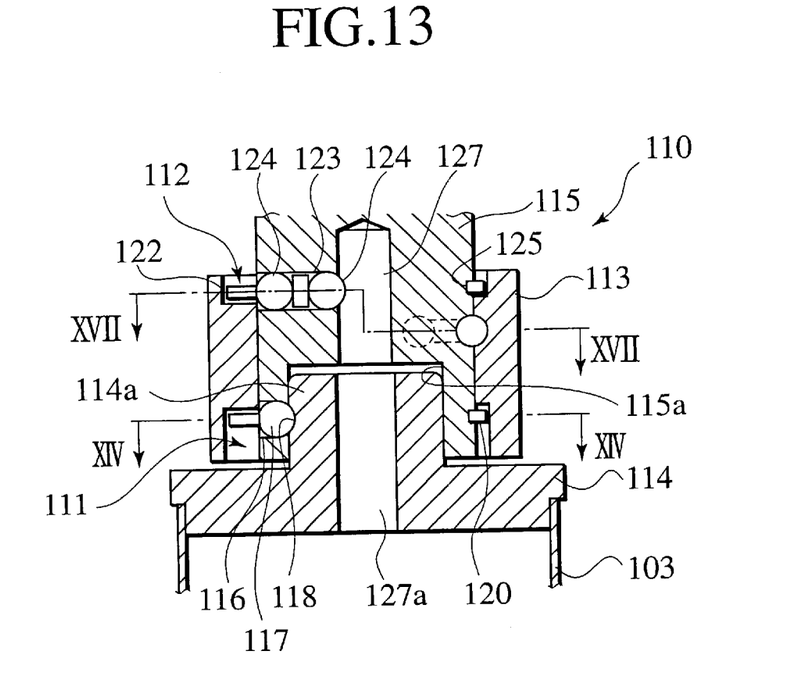
FIG. 13 is a schematic view showing a second embodiment of a separation type hole saw in accordance with the present invention.
Figure 14:
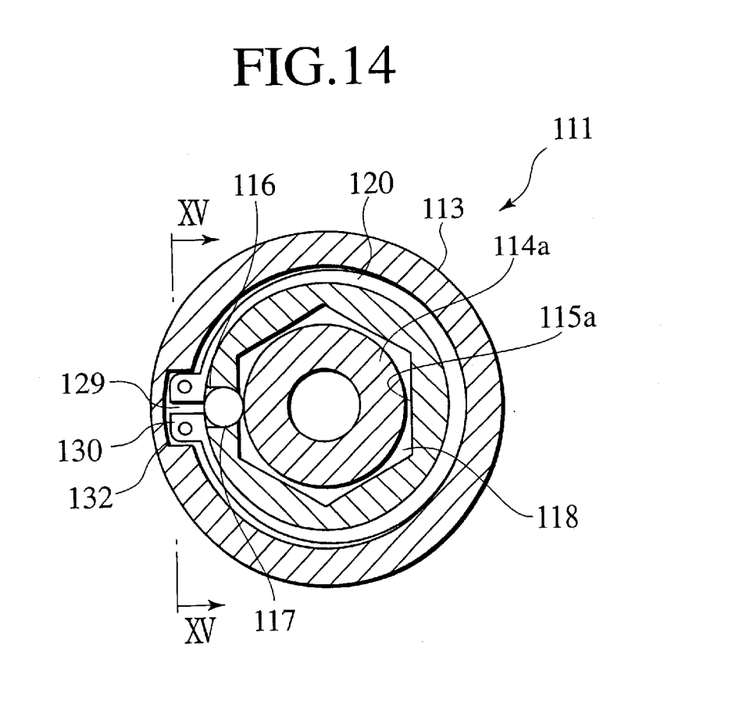
FIG. 14 is a cross sectional view taken along a line XIV—XIV in FIG. 13, showing a lock cancel state of a hole saw mounting metal fitting attaching and detaching portion.
Figure 15:
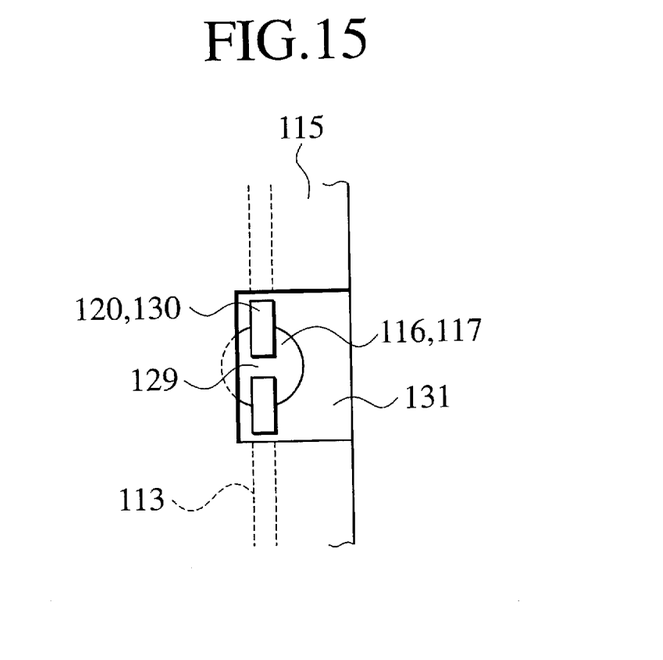
FIG. 15 is a horizontal cross sectional view taken along XV—XV in FIG. 14.
Figure 16:
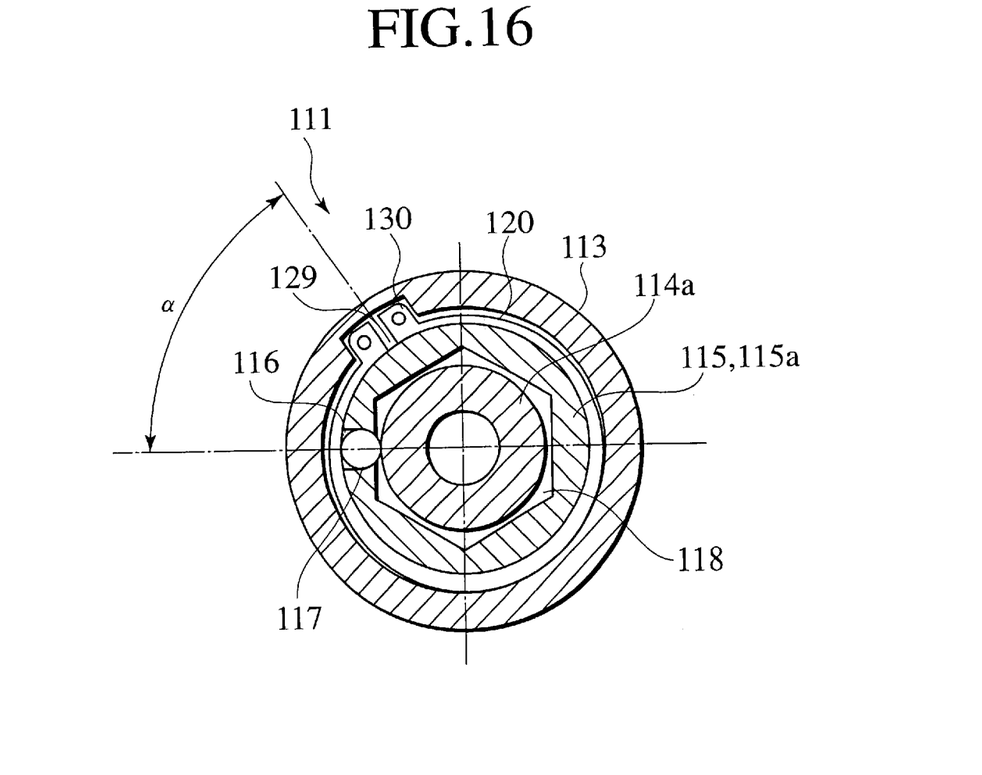
FIG. 16 is a view showing a lock state of the hole saw mounting metal fitting attaching and detaching portion.
Figure 17:
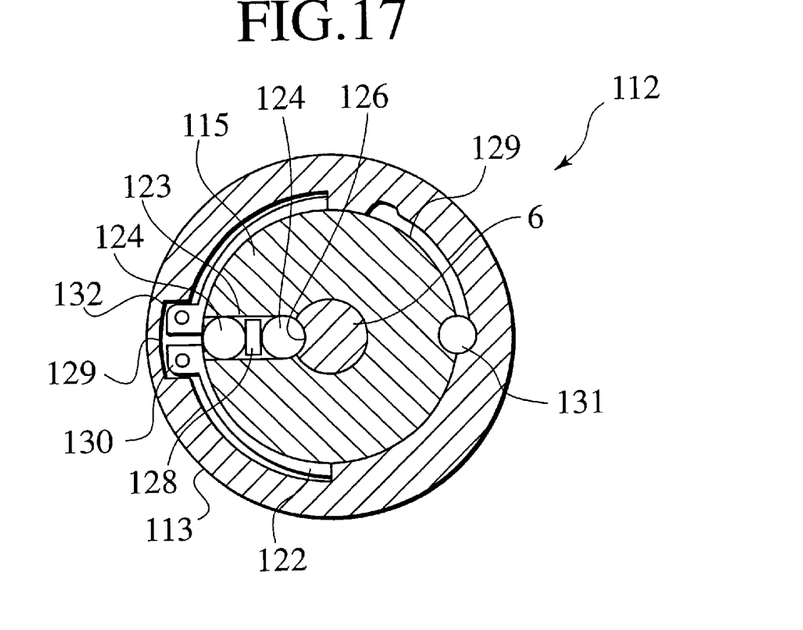
FIG. 17 is a cross sectional view taken along XVII—XVII in FIG. 13, showing a lock cancel state of a center pin attaching and detaching portion.
Figure 18:
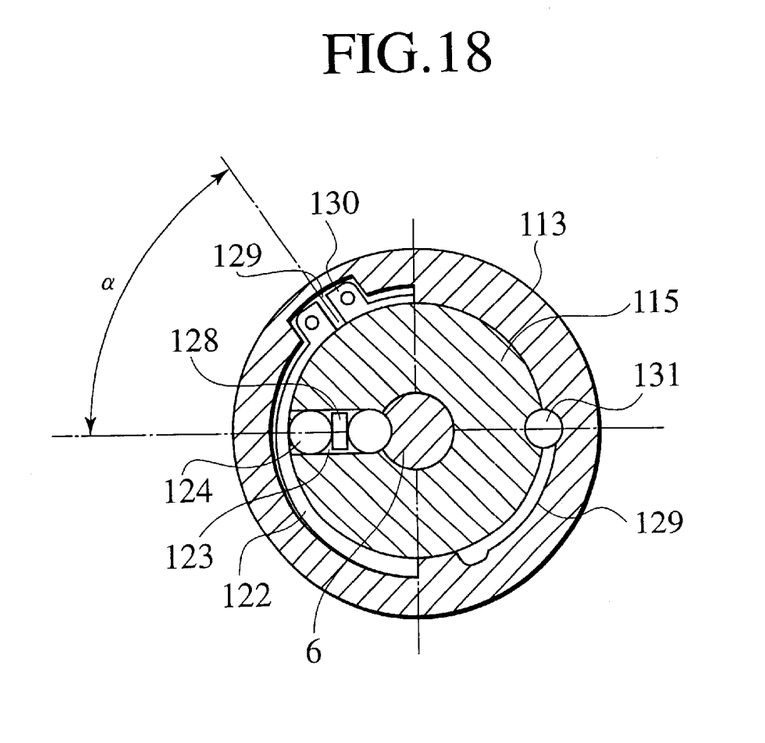
FIG. 18 is a view showing a lock state of the center pin attaching and detaching portion.

FIG. 13 is a schematic view showing a second embodiment of a separation type hole saw in accordance with the present invention, FIG. 14 is a cross sectional view taken along a line XIV—XIV in FIG. 13, showing !a lock cancel state of a hole saw mounting metal fitting attaching and detaching portion, FIG. 15 is a horizontal cross sectional view taken along XV—XV in FIG. 14, FIG. 16 is a view showing a lock state of the hole saw mounting metal fitting attaching and detaching portion, FIG. 17 is a cross sectional view, taken along XVII—XVII in FIG. 13, showing a lock cancel state of a center pin attaching and detaching portion, and FIG. 18 is a view showing a lock state of the center pin attaching, and detaching portion. In FIGS. 13 to 18, a separation type hole saw 110 in accordance with the present invention is mainly constituted by a hole saw mounting metal fitting attaching and detaching portion 111, a center pin attaching and detaching portion 112 and an outer peripheral ring 113.

The hole saw mounting metal fitting attaching and detaching portion 111 is constituted by fitting portions 114*a* and 115*a* formed between another end of a hole saw mounting metal fitting 114 and one end of a shank 115 so as to form a polygonal shape (a hexagonal shape in the present embodiment), thereby being fitted to each other, a hole portion 116 drilled from an outer peripheral surface of the shank fitting portion 115*a* in a direction of the fitting portion 114*a* of the hole saw mounting metal fitting 114, a spherical body 117 inserted to the hole portion 116, a recess circular arc shaped annular groove 118 (a first annular groove 118) engaged with the spherical body 117 on an outer peripheral surface of the fitting portion 114*a* of the hole saw mounting metal fitting 114, an annular groove 121 (a second annular groove 121) provided along an outer peripheral surface of the fitting portion 115*a* of the shank 115 via the hole portion 116, and annular spring 120 inserted into the annular groove 121, applying a pressing force to the spherical body 117 and attach the hole saw mounting metal fitting 114 to the shank 115.

Further, the center pin attaching and detaching portion 112 is constituted by an annular arc groove 126 provided near an insertion end of the center pin with respect to the shank 115, a hole portion 123 drilled toward the circular groove 126 provided in the shank 115, two spherical bodies 124 inserted to the hole portion 123, an annular groove 125 (a third annular groove 125) provided along an outer peripheral surface of the shank 115 via the hole portion 123, and an annular spring 122 inserted into the annular groove 125 and applying a pressing force to the spherical body 124 so as to attach the center pin 6 to the shank 115. In the present embodiment, the annular spring 120 and 122 have absolutely the same size capable of being commonly used.

In this case, reference numerals 127 and 127a denotes an insertion hole of the center pin 6 provided in the shank 115 and the hole saw mounting metal fitting 114.

Figure 19A:
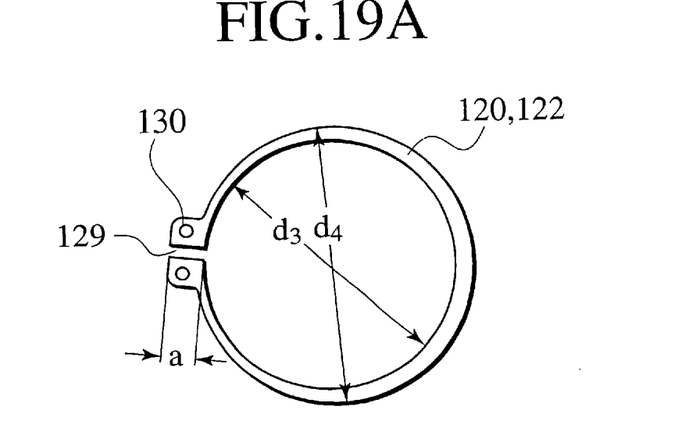
FIG. 19A is a front elevational view of a summary of an annular spring.
Figure 19B:
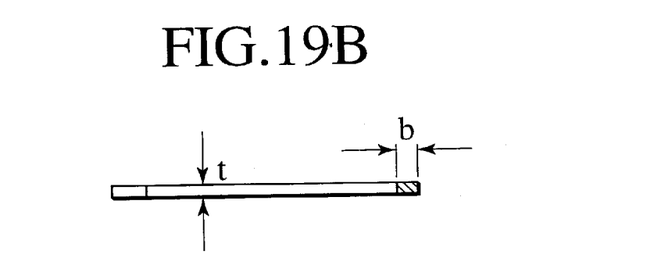
FIG. 19B is a plan view of the same.
Figure 20:
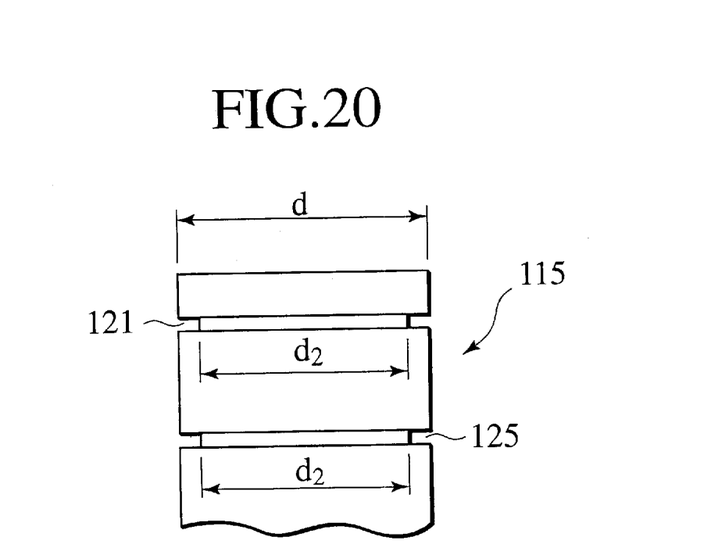
FIG. 20 is a schematic view of an annular groove provided in an outer periphery of a shank.

As shown in FIGS. 19 and 20, when setting an outer diameter of the annular springs 120 and 122 to be the same as the outer diameter d1 of an applied shank 115, for example, 25 mm, a reference size of a groove diameter d2 is set to 23.9 mm, a reference size of a groove width m is set to 1.35 mm, a reference size of a spring inner diameter d3 is set to 23.4 mm, a reference size of a spring width b is set to 3.1 mm and a reference size of a height 'a' of a protruding portion 130 provided in a gap portion 129 is set to 4.3 mm, so that these sizes are made standards.

As shown in FIGS. 14 and 17, the outer peripheral ring 113 is rotatably provided in an outer periphery of the shank 115, and has a receiving portion 132 receiving a projection portion 130 of the annular springs 120 and 122 in an inner surface thereof. Further, in order to keep a desired angle, a rotational angle of about 60 degrees in the present embodiment, in the outer peripheral ring 113, an annular groove 129 having an angle of about 60 degrees and a spherical body 131 attached to the shank 115 surface are provided in an inner surface of the outer peripheral ring 113. Accordingly, the outer peripheral ring 113 can rotate the annular springs 120 and 122 by the receiving portion 132 and simultaneously perform a locking operation or a lock canceling operation between the hole saw mounting metal fitting attaching portion 111 and the center pin attaching portion 112 in a one-touch manner.

Since the spherical body 117 is under an easily attached and detached state (a lock canceled state) capable of escaping in an outer direction when the gap portion 129 of the annular spring 120 is placed on the spherical body 117, the hole saw mounting metal fitting 114 can be prevented from falling down from the shank 115 by aligning the hexagonal fitting portions 114a and 115a with each other so as to insert, aligning the spherical body 117 with the annular groove 118 of the hole saw mounting metal fitting 114 and holding the spherical body 117 within the annular groove 118 due to an elastic force of the annular spring 120.

In the same manner, since the spherical body 124 slightly escapes in an outer direction so as to be under an easily attached and detached state (a lock canceled state) when the gap portion 129 of the annular spring 122 is on the spherical body 124 as shown in FIG. 17, the hole saw mounting metal fitting 102 can be prevented from being fallen down from the shank 115 by aligning the spherical body 124 within the hole portion 123 of the shank 115 with the circular arc groove 126 of the center pin 6 and holding the spherical body 117 within the annular groove 118 due to the elastic force of the annular spring 122. in this case, reference numeral 128 denotes a cushion member interposed between two spherical bodies 124 and 124.

As shown in FIGS. 16 and 18, at a position satisfying the elation rotational angle α of the outer peripheral ring 113= about 60 degrees, since the respective spherical bodies 117 and 124 are not in the gap portion 129 between the annular springs 120 and 122, the spherical bodies are prevented from escaping in an outer direction so as to be held in a lock state, and can not be removed.

Figure 21:
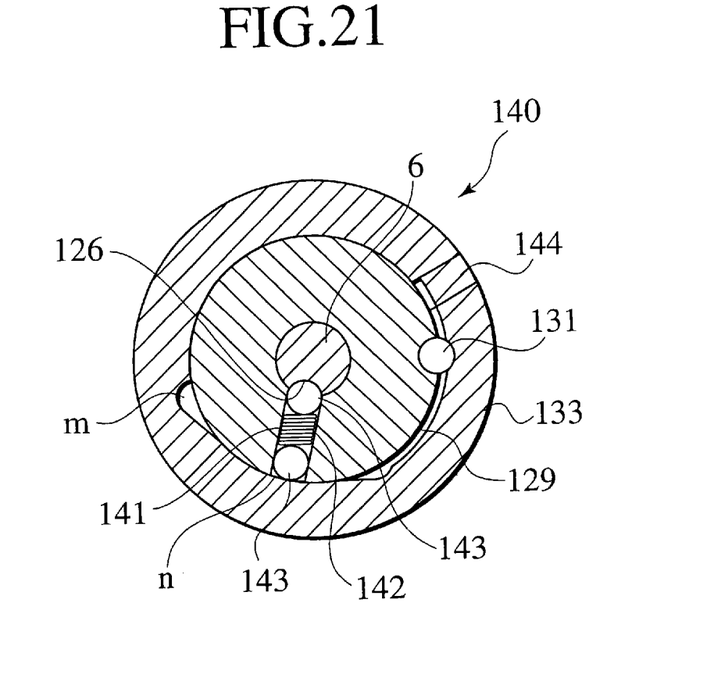
FIG. 21 is a schematic view showing another embodiment of the center pin attaching and detaching portion in accordance with the present invention.

FIG. 21 is a schematic view showing another embodiment of the center pin attaching and detaching portion. In the drawing, a center pin attaching and detaching portion 140 is constituted by a circular arc groove 126 provided near an insertion end of the shank 115 of the center pin 6, a hole portion 141 (a third hole portion 141) drilled toward the circular arc groove 126, and two spherical bodies 143 and 143 (third spherical bodies 143) applying a pressing force to the circular arc groove 126 via an elastic member inserted to the hole portion 141, for example, a coil spring 142 so as to attach the center pin 6 to the shank 115.

Figure 22:
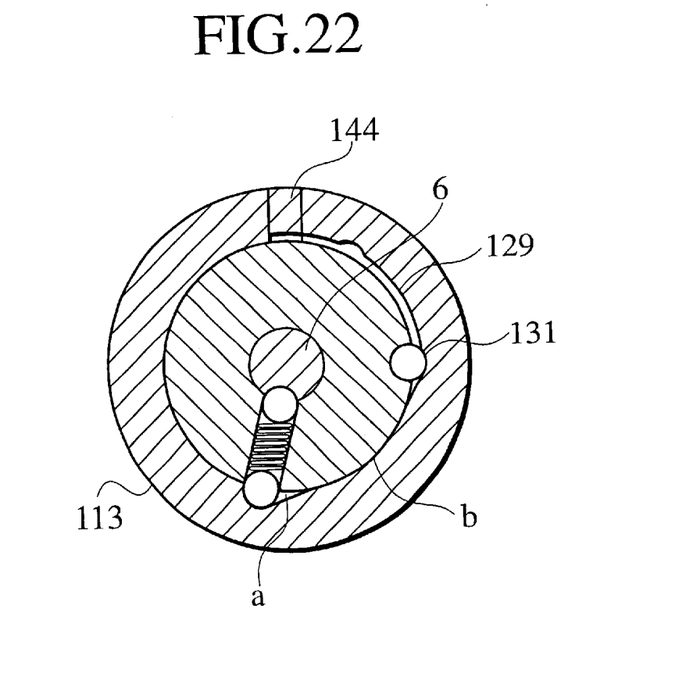
FIG. 22 is a view of a lock cancel state of FIG. 21.

In this case, a portion 'm' having an interval with respect to the spherical body 143 and a portion 'n' having an interval 'a' being set to be almost 0 are provided in the inner periphery of the outer peripheral ring 133, an annular groove 129 having an angle of about 60 degrees and a spherical body 131 inserted between the shank 115 and the outer peripheral ring 113 are provided in an inner periphery of the outer peripheral ring 133 in order to keep the outer peripheral ring 133 in a desired angle, a rotational angle of about 60 degrees in the present embodiment, and it is possible to simultaneously perform a locking operation and a lock canceling operation between the hole saw mounting metal fitting attaching portion 111 and the center pin attaching portion 140. FIG. 21 shows a lock state and FIG. 22 shows a lock cancel state. In this case, reference numeral 1.44 denotes a cover foreclosing the insertion hole after assembling the spherical body 143, the spring 141 and the spherical body 131.

Figure 23:
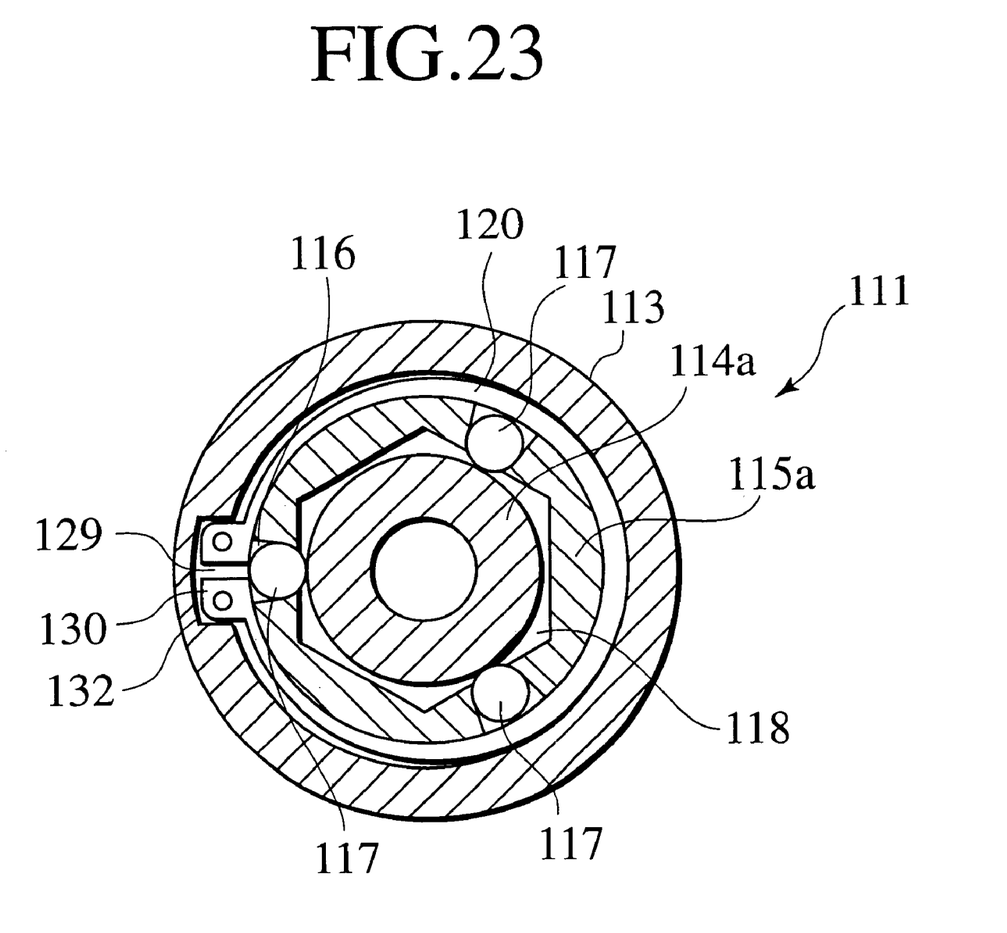
FIG. 23 is a schematic view showing the other embodiment of the hole saw mounting metal fitting attaching and detaching portion.

FIG. 23 is a schematic view showing the other embodiment of the hole saw mounting metal fitting attaching and detaching portion. In the drawing, the same reference numerals are attached to the elements having the same functions as those in FIGS. 14 and 16. The hole saw mounting metal fitting attaching and detaching portion 111 has three hole portions 116 obtained by uniformly separating and drilling the circumference into three portions at every 120 degrees toward the fitting portion 114a of the hole saw mounting metal fitting 114 from the outer peripheral surface of the fitting portion 115a of the shank 115, and three spherical bodies 117 inserted to the hole portion 116. As mentioned above, by providing three spherical bodies 116, it is easy to improve a concentricity between the shank 115 and the hole saw mounting metal fitting 114.

As mentioned above, in comparison with the conventional hole saw, the separation type hole saw 110 in accordance with the present invention can be replaced in a one-touch manner, is detachable, is easily treated, has an improved operation efficiency, and has an increased concentricity.

The entire contents of Japanese Patent Applications P11-186822 (filed Jun. 30, 1999), P11-222645 (filed Aug. 5, 1999) and P2000-22368 (filed Jan. 31, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A separation type hole saw, comprising:
   a hole saw (103);
   a hole saw mounting metal fitting (114), in which one end of the hole saw mounting metal fitting (114) is integrally mounted to the hole saw (103), a fitting convex portion (114a) is formed in another end of the hole saw mounting metal fitting (114), and a first annular groove (118) is formed in an outer periphery of the fitting convex portion (114a);
   a shank (115), in which a polygonal fitting recess portion (115a) is formed in one end of the shank (115), the fitting convex portion (114a) of the hole saw mounting metal fitting (114) is inserted to the fitting recess portion (115a), another end of the shank (115) is attached to a rotational shaft portion of a working machine, a first hole portion (116) extending through the fitting recess portion (115a) from an outer peripheral surface of the shank (115) is provided, a second annular groove (121) is formed in an outer periphery at a position of the first hole portion (116) of the shank (115), a center pin insertion hole (127) is formed in the shank (115), a second hole portion (123) extending through the center pin insertion hole (127) from an outer peripheral surface is further formed in the shank (115), and a third annular groove (125) is formed in an outer periphery at a position of the second hole portion (123) of the shank (115);

a first spherical body (117) inserted to the first hole portion (116);

a first annular spring (120) inserted to the second annular groove (121), the first annular spring (120) urging the first spherical body (117) so that the first spherical body (117) presses the fitting convex portion (114a) of the hole saw mounting metal fitting (114), thereby preventing the fitting recess portion (115a) of the shank (115) from being taken out from the fitting convex portion (114a) of the hole saw mounting metal fitting (114) due to the pressing operation of the first spherical body (117);

a center pin (6) inserted to a center portion of the shank (115) and guiding the hole saw (103) at a time of drilling a material, in which a circular arc groove (126) is formed in an outer peripheral surface of an end portion of the center pin (6) inserted to the shank (115);

a second spherical body (124) inserted to the second hole portion (123);

a second annular spring (122) inserted to the third annular groove (125), the second annular spring (122) urging the second spherical body (124) so that the second spherical body (124) presses the circular arc groove (126) of the center pin (6), thereby preventing the center pin (6) from being taken out from the center pin insertion hole (127) due to the pressing operation of the second spherical body (124); and an outer peripheral ring (113) provided in an outer periphery of the shank (115), in which the first annular spring (120) and the second annular spring (122) rotate at a desired rotational angle and a pressing force applied to the first spherical body (117) and the second spherical body (124) by the first annular spring (120) and the second annular spring (122) is changed when the outer peripheral ring (113) is rotated around a shaft of the shank (115), whereby a locking and canceling operation of the center pin (6) with respect to the center pin insertion hole (127) and a locking and canceling operation between the fitting recess portion (115a) of the shank (115) and the fitting convex portion (114a) of the hole saw mounting metal fitting (114) are simultaneously performed.

2. A separation type hole saw according to claim 1, wherein a third hole portion (141) extending through the center pin insertion hole (127) is formed in the outer peripheral surface of the shank (115), a third spherical body (143) is inserted to the third hole portion (141), the third spherical body (143) presses the annular arch groove (126) of the center pin (6) so as to prevent the center pin (6) from being taken out from the center pin insertion hole (127), and the locking and canceling operation of the center pin (6) with respect to the center pin insertion hole (127) is performed by rotating the outer peripheral ring (113) at a desired rotational angle.

3. A separation type hole saw according to claim 1, wherein a guide groove (129) is formed in an inner surface of the outer peripheral ring (113), a fourth spherical body (131) is inserted between the guide groove (129) and the shank (115), and the guide groove (129) is formed such that a rotational angle of the outer peripheral ring (113) is kept 60 degrees.

4. A separation type hole saw according to claim 1, wherein the first hole portion (116) is uniformly separated into three sections in a direction of extending through the fitting recess portion (115a) from the outer peripheral surface of the shank (115), and three first spherical bodies (117) are respectively inserted to the three first hole portions (116).

* * * * *